(12) United States Patent
Burns et al.

(10) Patent No.: US 8,728,685 B2
(45) Date of Patent: May 20, 2014

(54) METHOD OF MAKING HOLOGRAPHIC STORAGE MEDIUM

(75) Inventors: Andrew A. Burns, Niskayuna, NY (US); Sumeet Jain, Albany, NY (US); Pradeep Jeevaji Nadkarni, Bangalore (IN); Shantaram Narayan Naik, Bangalore (IN); Arunkumar Natarajan, Niskayuna, NY (US); Kiran ArunKumar Puthamane, South Kodagu (IN); Michael T. Takemori, Rexford, NY (US); Vinodkumar Vasudevan, Kerala (IN)

(73) Assignee: Sabic Innovative Plastics IP B.V. (NL)

( * ) Notice: Subject to any disclaimer, the term of this patent is extended or adjusted under 35 U.S.C. 154(b) by 62 days.

(21) Appl. No.: 13/028,807

(22) Filed: Feb. 16, 2011

(65) Prior Publication Data

US 2012/0208110 A1 Aug. 16, 2012

Related U.S. Application Data

(63) Continuation-in-part of application No. 12/491,357, filed on Jun. 25, 2008, now abandoned.

(51) Int. Cl.
*G03H 1/04* (2006.01)
*G03H 1/00* (2006.01)

(52) U.S. Cl.
CPC .......... *G03H 1/04* (2013.01); *G03H 2001/0016* (2013.01); *G03H 2250/34* (2013.01); *G03H 2240/22* (2013.01)
USPC ........................................ 430/1; 430/2; 359/3

(58) Field of Classification Search
None
See application file for complete search history.

(56) References Cited

U.S. PATENT DOCUMENTS

| | | | | |
|---|---|---|---|---|
| 3,833,383 A | * | 9/1974 | Ryan et al. | 430/2 |
| RE28,225 E | * | 11/1974 | Heseltine et al. | 430/2 |
| 4,908,293 A | * | 3/1990 | Katoh et al. | 430/264 |
| 5,633,100 A | * | 5/1997 | Mickish et al. | 430/1 |
| 5,747,225 A | * | 5/1998 | Manico et al. | 430/345 |
| 5,888,694 A | * | 3/1999 | Yamada et al. | 430/264 |
| 6,266,166 B1 | * | 7/2001 | Katsumata et al. | 359/3 |
| 6,547,390 B1 | * | 4/2003 | Bernheim et al. | 351/159.61 |

(Continued)

FOREIGN PATENT DOCUMENTS

| | | | |
|---|---|---|---|
| JP | 63-291082 | * | 11/1988 |
| JP | 02-046443 | * | 2/1990 |

(Continued)

OTHER PUBLICATIONS machine translation of JP 2003-308634.*

(Continued)

*Primary Examiner* — Martin Angebranndt
(74) *Attorney, Agent, or Firm* — Cantor Colburn LLP

(57) ABSTRACT

Articles for recording a holographic image are described. The articles include a holographic recording medium having a plurality of surfaces, having a transparent polymeric binder and a photochemically active dye, the holographic recording medium having a holographic image recorded therein formed by exposed areas of the photochemically active dye and unexposed areas of the photochemically active dye; and a first light-blocking layer or material over a first surface of the holographic recording medium from which surface the holographic image is viewed, the light blocking layer or material absorbing light in the wavelength range to which the photochemically active dye is sensitive and allowing transmission of light in a different wavelength range for viewing the holographic image.

18 Claims, 7 Drawing Sheets

(56) References Cited

U.S. PATENT DOCUMENTS

| | | | |
|---|---|---|---|
| 7,173,744 B1 | 2/2007 | Whiteside et al. | |
| 7,300,727 B2 * | 11/2007 | Kazmaier et al. | 430/19 |
| 2003/0134105 A1 * | 7/2003 | Toshine et al. | 428/323 |
| 2003/0165746 A1 * | 9/2003 | Stadler et al. | 430/1 |
| 2005/0136260 A1 * | 6/2005 | Garcia | 428/411.1 |
| 2005/0208388 A1 * | 9/2005 | Furuki et al. | 430/1 |
| 2005/0231774 A1 * | 10/2005 | Hayashi et al. | 359/10 |
| 2005/0270614 A1 * | 12/2005 | Kuwabara et al. | 359/238 |
| 2006/0073392 A1 | 4/2006 | Erben et al. | |
| 2006/0077870 A1 * | 4/2006 | Inoue et al. | 369/275.1 |
| 2006/0126141 A1 * | 6/2006 | Hirao et al. | 359/3 |
| 2006/0222960 A1 | 10/2006 | Ueda et al. | |
| 2007/0114366 A1 * | 5/2007 | Wisnudel et al. | 250/221 |
| 2007/0174854 A1 * | 7/2007 | Jungermann et al. | 720/600 |
| 2008/0084592 A1 * | 4/2008 | Boden et al. | 359/2 |
| 2008/0259417 A1 * | 10/2008 | Wiltshire | 359/3 |
| 2008/0311521 A1 * | 12/2008 | Kazmaier et al. | 430/286.1 |
| 2010/0208313 A1 | 8/2010 | Horgan et al. | |
| 2010/0328741 A1 * | 12/2010 | Cheverton et al. | 359/2 |
| 2011/0082035 A1 * | 4/2011 | Morimitsu et al. | 503/201 |
| 2011/0092364 A1 * | 4/2011 | Morimitsu et al. | 503/201 |
| 2012/0178019 A1 * | 7/2012 | Jain et al. | 430/2 |
| 2012/0250119 A1 * | 10/2012 | Takemori et al. | 359/3 |
| 2013/0183608 A1 * | 7/2013 | Burns et al. | 430/2 |

FOREIGN PATENT DOCUMENTS

| | | | |
|---|---|---|---|
| JP | 03-171443 | * | 7/1991 |
| JP | 09-054539 | * | 2/1997 |
| JP | 2000-172155 | * | 6/2000 |
| JP | 2003-308634 | * | 10/2003 |
| JP | 2004-354712 | * | 12/2004 |

OTHER PUBLICATIONS

Downie, J.D., et al., "Long Holographic Lifetimes in Bacteriorhodopsin Films", Optics Letters, vol. 23, No. 9, Optical Society of America, May 1, 1998, pp. 730-732.

Erben, C., et al.; "Non-Volatile Holographic Data Storage Media based on Dye-Doped Thermoplastic", Optical Data Storage Topical Meeting, Apr. 23-26, 2006, pp. 209-211.

International Search Report for PCT/US2012/025230 dated Jun. 11, 2012, 6 pages.

Written Opinion for PCT/US2012/025230 dated Jun. 11, 2012, 11 pages.

* cited by examiner

METHOD OF MAKING HOLOGRAPHIC STORAGE MEDIUM

This is a continuation-in-part of U.S. patent application Ser. No. 12/491,357, filed Jun. 25, 2009, now abandoned.

BACKGROUND

The present disclosure relates to molded articles that incorporate holograms, more particularly color transmission holograms. Methods of making and using the same are also disclosed.

Holograms are an increasingly popular mechanism for the authentication of genuine articles, whether it is for security purposes or for brand protection. The use of holograms for these purposes is driven primarily by the relative difficulty with which they can be duplicated. Holograms are created by interfering two or more coherent beams of light to create an interference pattern and storing that pattern in a holographic recording medium. Information or imagery can be stored in a hologram by imparting the data or image to one of the two coherent beams prior to their interference. The hologram can be read out by illuminating it with beams matching either of the two original beams used to create the hologram and any data or images stored in the hologram will be displayed. As a result of the complex methods required to record holograms, their use for authentication has been proposed or implemented on articles such as credit cards, software, passports, clothing, electronics and the like.

Two categories of holograms include surface relief structure holograms and volume holograms. Many of the holograms used in security or authentication applications are of the surface relief type, in which the pattern and any data or image contained therein is stored in the structure or deformations imparted to the surface of the recording medium. As a result, the first recorded hologram may be created by the interference of two coherent beams, but duplicates can be created by copying the surface structure using techniques such as embossing. The duplication of holograms is convenient for the mass production of articles such as credit cards or security labels, but it also has the disadvantage that it makes the unauthorized duplication and/or modification of these holograms for use in counterfeit parts possible from the originals using the same mechanism.

Unlike surface holograms, volume holograms are formed in the bulk of a recording medium. Volume holograms have the ability to be multiplexed, storing information at different depths and different angles within the bulk recording material and thus have the ability to store greater amounts of information. In addition, because the pattern which makes up the hologram is embedded, copying cannot be done using the same techniques as for surface relief holograms.

Many types of holographic recording media have been proposed, including silver halide emulsions, photoresists, photopolymers, and the like. Photochromic dye-based holograms have also been proposed for volume holograms, and they provide advantages not achievable by other holographic recording media, such as processability by thermoplastic techniques (molding, extrusion, lamination, etc.), instant hologram viewability, and latent photosensitivity after the initial writing. However, when incorporated into structures for real-world use, such as for security applications, the latent photosensitivity can lead to degradation of the recorded holographic image.

Thus, there remains a need for improved holographic materials for incorporation into structures such as security or authentication devices.

BRIEF DESCRIPTION

In an exemplary embodiment, a method of manufacturing an article for display of a holographic image comprises:
providing a holographic recording medium having a plurality of surfaces, comprising a photochemically active dye and a transparent polymeric binder; then
exposing the holographic recording medium to a plurality of coherent light sources emitting light at one or more wavelengths to which the photochemically active dye is sensitive, thereby forming a holographic image therein formed by photoreacted areas of the photochemically active dye and unreacted areas of the photochemically active dye; and then
disposing a first light-blocking layer or material over a first surface of the holographic recording medium from which surface the holographic image is viewed, said light blocking layer or material absorbing light in the wavelength range to which the photochemically active dye is sensitive and allowing transmission of light in a different wavelength range for viewing the holographic image.

In another exemplary embodiment, an article for displaying a holographic image comprises:
a holographic recording medium having a plurality of surfaces, comprising a transparent polymeric binder and a photochemically active dye, said holographic recording medium having a holographic image recorded therein formed from photoreacted areas of the photochemically active dye and unreacted areas of the photochemically active dye; and
a first light-blocking layer or material over a first surface of the holographic recording medium from which surface the holographic image is viewed, said light blocking layer or material absorbing light in the wavelength range to which the photochemically active dye is sensitive and allowing transmission of light in a different wavelength range for viewing the holographic image.

BRIEF DESCRIPTION OF THE DRAWINGS

Referring now to the Figures, which represent exemplary embodiments and wherein like elements may be numbered alike.

DETAILED DESCRIPTION

Figure 1:
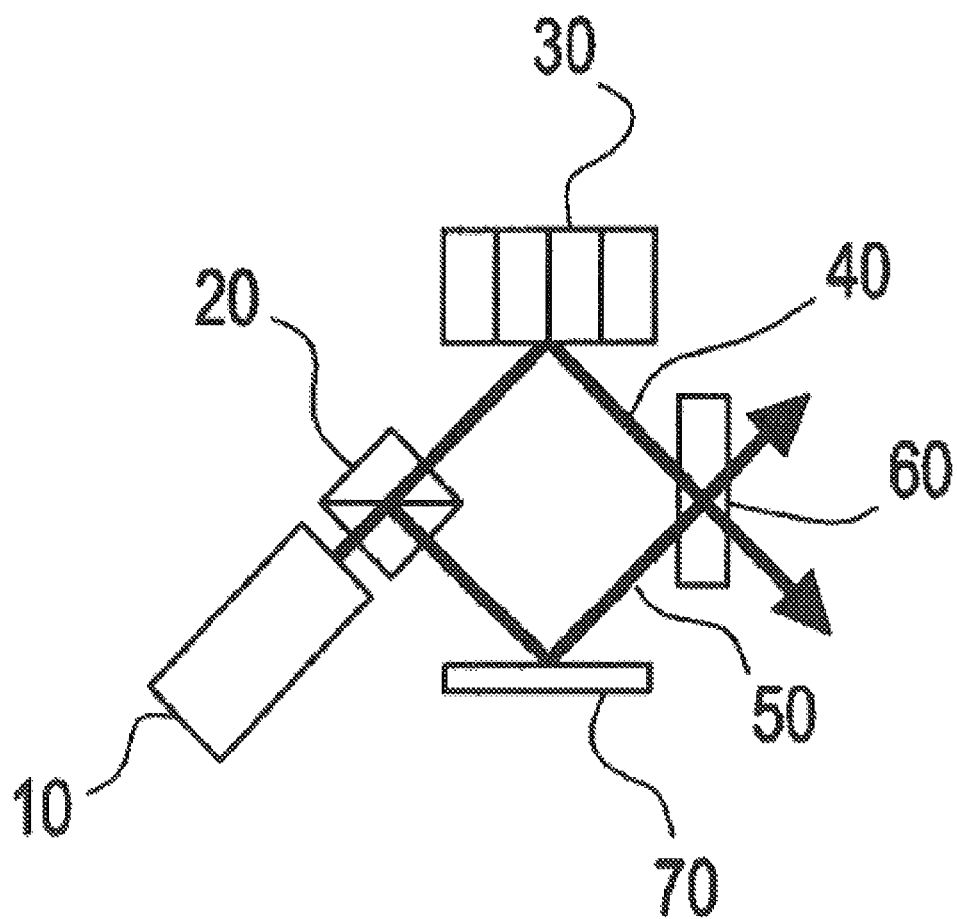
FIG. 1 represents a simplified diagram of an apparatus for recording a transmission hologram.

The holographic recording medium disclosed herein comprises a transparent polymeric binder with a photochemically active dye dispersed therein. The polymeric binder may be a thermoplastic polymer, thermosetting polymer, or a combination comprising one or more of such polymers. The polymers can be oligomers, polymers, dendrimers, ionomers, copolymers such as for example, block copolymers, random copolymers, graft copolymers, star block copolymers; or the like, or a combination comprising at least one of the foregoing polymers. Exemplary thermoplastic organic polymers that can be used in the binder composition include, without limitation, polyacrylates, polymethacrylates, polyesters (e.g., cycloaliphatic polyesters, resorcinol arylate polyester, and so forth), polyolefins, polycarbonates, polystyrenes, polyamideimides, polyarylates, polyarylsulfones, polyethersulfones, polyphenylene sulfides, polysulfones, polyimides, polyetherimides, polyetherketones, polyether etherketones, polyether ketone ketones, polysiloxanes, polyurethanes, polyethers, polyether amides, polyether esters, or the like, or a combination comprising at least one of the foregoing thermoplastic polymers (either in admixture or co- or graft-polymerized), such as polycarbonate and polyester.

Exemplary polymeric binders are described herein as "transparent". Of course, this does not mean that the polymeric binder does not absorb any light of any wavelength. Exemplary polymeric binders need only be reasonably transparent in wavelengths for exposure and viewing of a holographic image so as to not unduly interfere with the formation and viewing of the image. In an exemplary embodiment, the polymer binder has an absorbance in the relevant wavelength ranges of less than 0.2. In another exemplary embodiment, the polymer binder has an absorbance in the relevant wavelength ranges of less than 0.1. In yet another exemplary embodiment, the polymer binder has an absorbance in the relevant wavelength ranges of less than 0.01. Organic polymers that are not transparent to electromagnetic radiation can also be used in the binder composition if they can be modified to become transparent. For examples, polyolefins are not normally optically transparent because of the presence of large crystallites and/or spherulites. However, by copolymerizing polyolefins, they can be segregated into nanometer-sized domains that cause the copolymer to be optically transparent.

In one embodiment, the organic polymer and photochromic dye can be chemically attached. The photochromic dye can be attached to the backbone of the polymer. In another embodiment, the photochromic dye can be attached to the polymer backbone as a substituent. The chemical attachment can include covalent bonding, ionic bonding, or the like.

Examples of cycloaliphatic polyesters for use in the binder composition are those that are characterized by optical transparency, improved weatherability and low water absorption. It is also generally desirable that the cycloaliphatic polyesters have good melt compatibility with the polycarbonate resins since the polyesters can be mixed with the polycarbonate resins for use in the binder composition. Cycloaliphatic polyesters are generally prepared by reaction of a diol (e.g., straight chain or branched alkane diols, and those containing from 2 to 12 carbon atoms) with a dibasic acid or an acid derivative.

Polyarylates that can be used in the binder composition refer to polyesters of aromatic dicarboxylic acids and bisphenols. Polyarylate copolymers include carbonate linkages in addition to the aryl ester linkages, known as polyester-carbonates. These aryl esters may be used alone or in combination with each other or more particularly in combination with bisphenol polycarbonates. These organic polymers can be prepared, for example, in solution or by melt polymerization from aromatic dicarboxylic acids or their ester forming derivatives and bisphenols and their derivatives.

Blends of organic polymers may also be used as the binder composition for the holographic devices. Specifically, organic polymer blends can include polycarbonate (PC)-poly (1,4-cyclohexane-dimethanol-1,4-cyclohexanedicarboxylate) (PCCD), PC-poly(cyclohexanedimethanol-co-ethylene terephthalate) (PETG), PC-polyethylene terephthalate (PET), PC-polybutylene terephthalate (PBT), PC-polymethylmethacrylate (PMMA), PC-PCCD-PETG, resorcinol aryl polyester-PCCD, resorcinol aryl polyester-PETG, PC-resorcinol aryl polyester, resorcinol aryl polyester-polymethylmethacrylate (PMMA), resorcinol aryl polyester-PCCD-PETG, or the like, or a combination comprising at least one of the foregoing.

Binary blends, ternary blends and blends having more than three resins may also be used in the polymeric alloys. When a binary blend or ternary blend is used in the polymeric alloy, one of the polymeric resins in the alloy may comprise about 1 to about 99 weight percent (wt %) based on the total weight of the composition. Within this range, it is generally desirable to have the one of the polymeric resins in an amount greater than or equal to about 20, preferably greater than or equal to about 30 and more preferably greater than or equal to about 40 wt %, based on the total weight of the composition. Also desirable within this range, is an amount of less than or equal to about 90, preferably less than or equal to about 80 and more preferably less than or equal to about 60 wt % based on the total weight of the composition. When ternary blends of blends having more than three polymeric resins are used, the various polymeric resins may be present in any desirable weight ratio.

Exemplary thermosetting polymers that may be used in the binder composition include, without limitation, polysiloxanes, phenolics, polyurethanes, epoxies, polyesters, polyamides, polyacrylates, polymethacrylates, or the like, or a combination comprising at least one of the foregoing thermosetting polymers. In one embodiment, the organic material can be a precursor to a thermosetting polymer.

As noted above, the photoactive material is a photochromic dye. The photochromic dye is one that is capable of being written and read by electromagnetic radiation. In one exemplary embodiment, the photochromic dyes can be written and read using actinic radiation i.e., from about 350 to about 1,100 nanometers. In a more specific embodiment, the wavelengths at which writing and reading are accomplished may be from about 400 nanometers to about 800 nanometers. In one exemplary embodiment, the reading and writing and is accomplished at a wavelength of about 400 to about 600 nanometers. In another exemplary embodiment, the writing and reading are accomplished at a wavelength of about 400 to about 550 nanometers. In one specific exemplary embodiment, a holographic medium is adapted for writing at a wavelength of about 405 nanometers. In such a specific exemplary embodiment, reading may be conducted at a wavelength of about 532 nanometers, although viewing of holograms may be conducted at other wavelengths depending on the viewing and illumination angles, and the diffraction grating spacing and angle. Examples of photochromic dyes include diarylethenes and nitrones.

An exemplary diarylethylene compound can be represented by formula (XI):

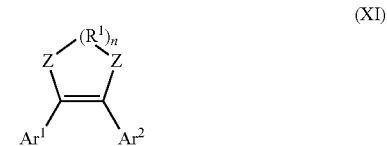

wherein n is 0 or 1; $R^1$ is a single covalent bond ($C_0$), $C_1$-$C_3$ alkylene, $C_1$-$C_3$ perfluoroalkylene, oxygen; or —N(CH$_2$)$_x$CN wherein x is 1, 2, or 3; when n is 0, Z is $C_1$-$C_5$ alkyl, $C_1$-$C_5$ perfluoroalkyl, or CN; when n is 1, Z is CH$_2$, CF$_2$, or C=O; Ar$^1$ and Ar$^2$ are each independently i) phenyl, anthracene, phenanthrene, pyridine, pyridazine, 1H-phenalene or naphthyl, substituted with 1-3 substituents wherein the substituents are each independently $C_1$-$C_3$ alkyl, $C_1$-$C_3$ perfluoroalkyl, or fluorine; or ii) represented by following formulas:

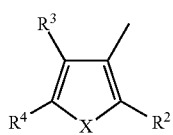

(XII)

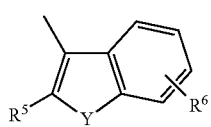

(XIII)

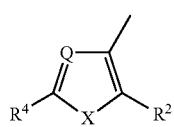

(XIV)

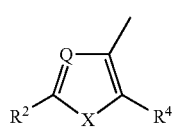

(XV)

wherein $R^2$ and $R^5$ are each independently $C_1$-$C_3$ alkyl or $C_1$-$C_3$ perfluoroalkyl; $R^3$ is $C_1$-$C_3$ alkyl, $C_1$-$C_3$ perfluoroalkyl, hydrogen, or fluorine; $R^4$ and $R^6$ are each independently $C_1$-$C_3$ alkyl, $C_1$-$C_3$ perfluoroalkyl, CN, hydrogen, fluorine, phenyl, pyridyl, isoxazole, —CHC(CN)$_2$, aldehyde, carboxylic acid, —($C_1$-$C_5$ alkyl)COOH or 2-methylenebenzo[d][1,3]dithiole; wherein X and Y are each independently oxygen, nitrogen, or sulfur, wherein the nitrogen is optionally substituted with $C_1$-$C_3$ alkyl or $C_1$-$C_3$ perfluoroalkyl; and wherein Q is nitrogen.

Examples of diarylethenes that can be used as photoactive materials include diarylperfluorocyclopentenes, diarylmaleic anhydrides, diarylmaleimides, or a combination comprising at least one of the foregoing diarylethenes. The diarylethenes are present as open-ring or closed-ring isomers. In general, the open ring isomers of diarylethenes have absorption bands at shorter wavelengths. Upon irradiation with ultraviolet light, new absorption bands appear at longer wavelengths, which are ascribed to the closed-ring isomers. In general, the absorption spectra of the closed-ring isomers depend on the substituents of the thiophene rings, naphthalene rings or the phenyl rings. The absorption structures of the open-ring isomers depend upon the upper cycloalkene structures. For example, the open-ring isomers of maleic anhydride or maleimide derivatives show spectral shifts to longer wavelengths in comparison with the perfluorocyclopentene derivatives.

Examples of diarylethene closed ring isomers include:

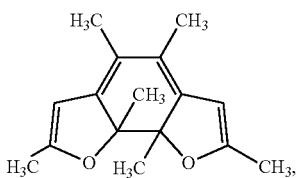

(XVI)

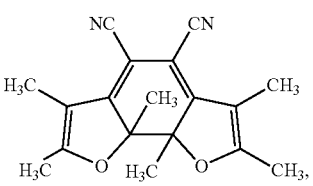

(XVII)

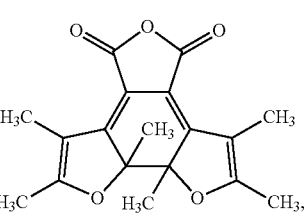

(XVIII)

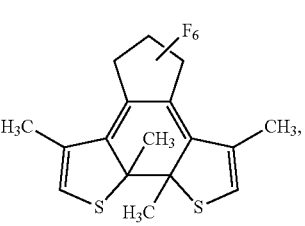

(XIX)

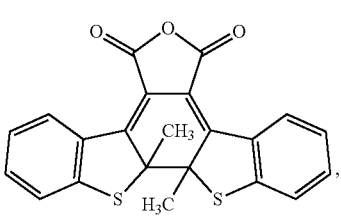

(XX)

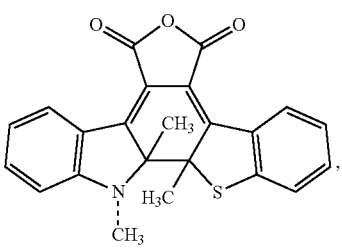

(XXI)

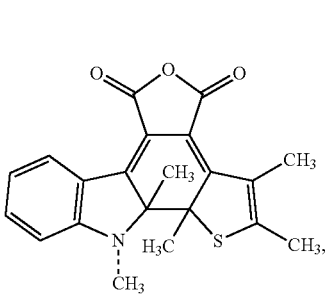

(XXII)

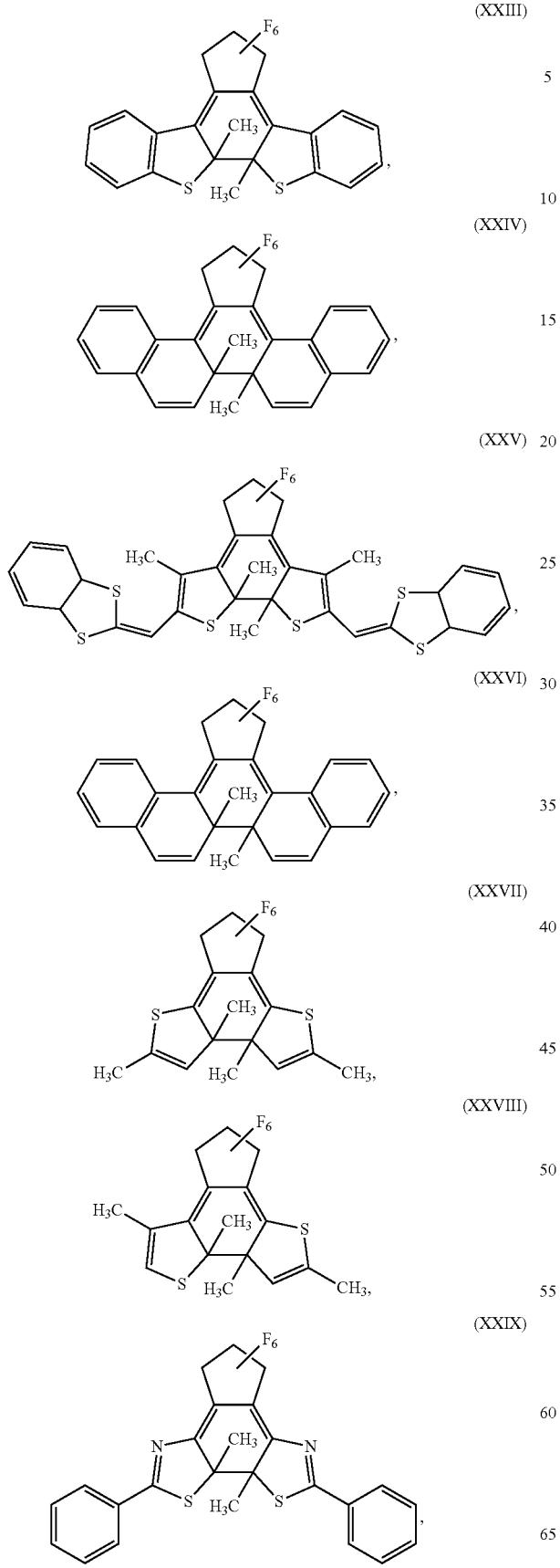
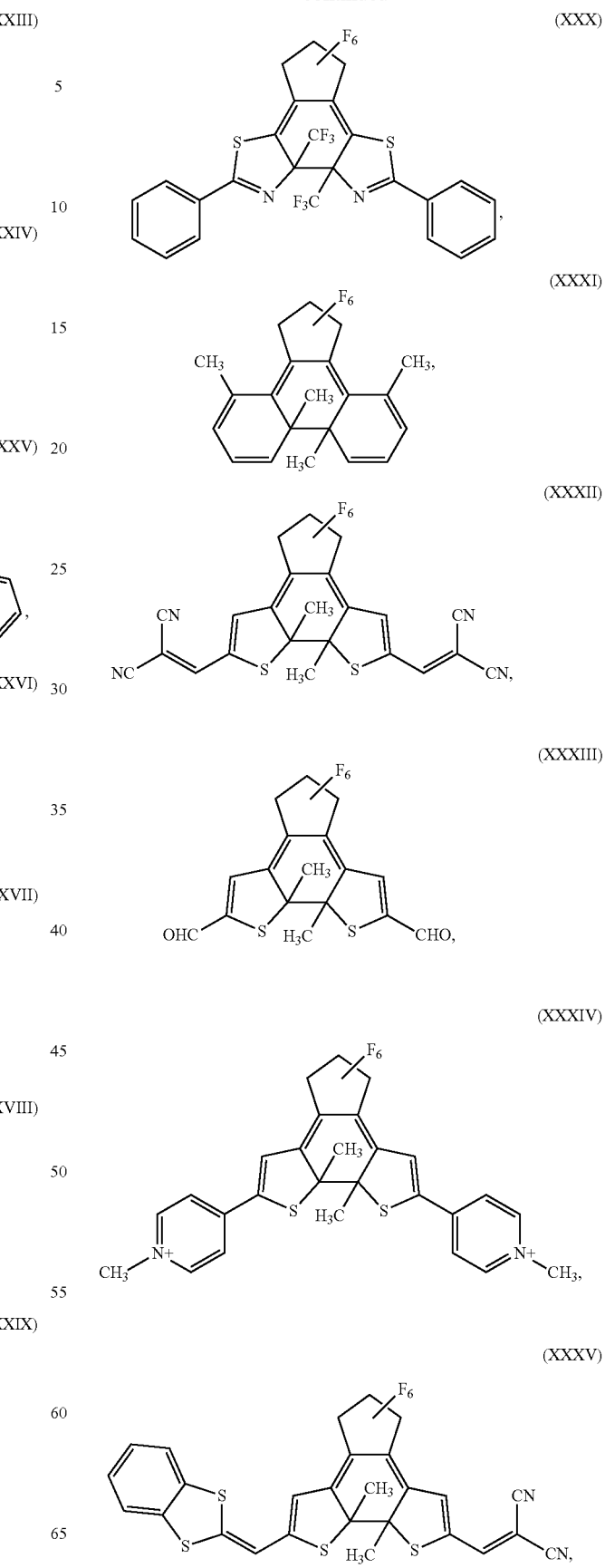

-continued

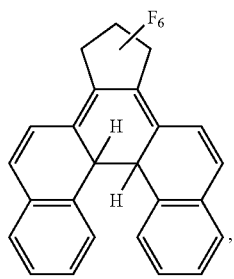 (XXXVI)

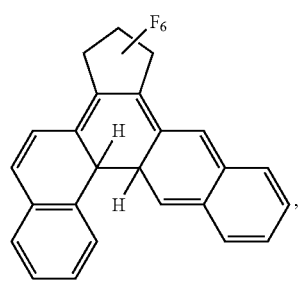 (XXXVII)

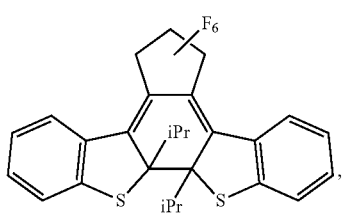 (XXXVIII)

where iPr represents isopropyl;

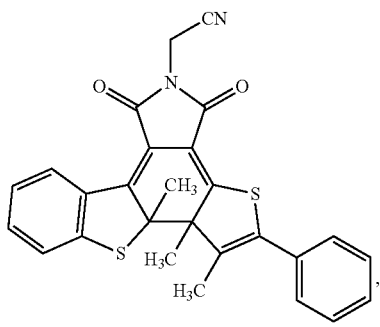 (XXXIX)

-continued

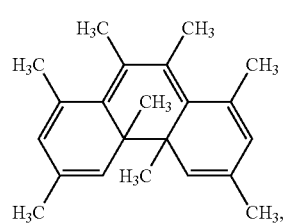 (XXXX)

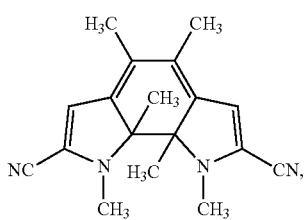 (XXXXI)

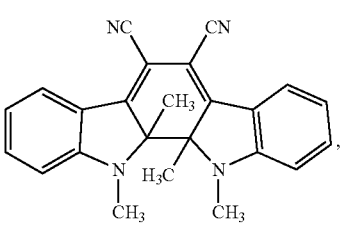 (XXXXII)

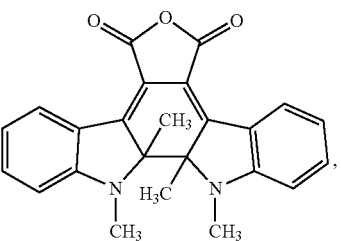 (XXXXIII)

and combinations comprising at least one of the foregoing diarylethenes.

Diarylethenes with five-membered heterocyclic rings have two conformations with the two rings in mirror symmetry (parallel conformation) and in $C_2$ (antiparallel conformation). In general, the population ratio of the two conformations is 1:1. In one embodiment, it is desirable to increase the ratio of the antiparallel conformation to facilitate an increase in the quantum yield, which is further described in detail below. Increasing the population ratio of the antiparallel conformation to the parallel conformation can be accomplished by covalently bonding bulky substituents such as the —($C_1$-$C_5$ alkyl)COOH substituent to diarylethenes having five-membered heterocyclic rings.

In another embodiment, the diarylethenes can be in the form of a polymer having the general formula (XXXXIV) below. The formula (XXXXIV) represents the open isomer form of the polymer.

(XXXXIV)

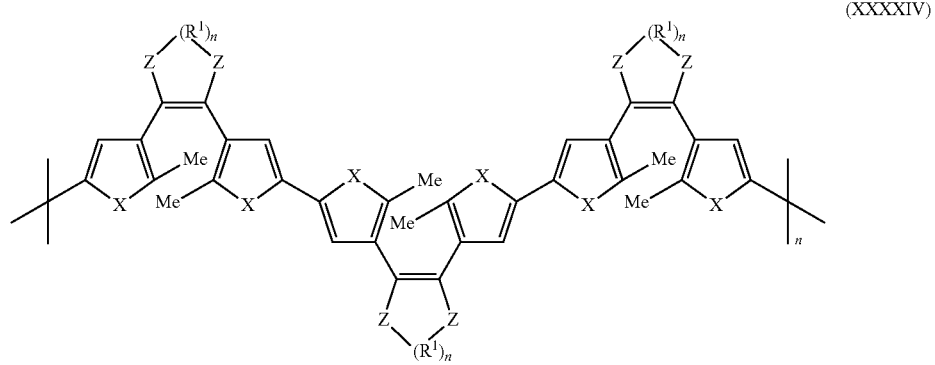

where Me represents methyl, $R^1$, X and Z have the same meanings as explained above in formulas (XI) through (XV) and n is any number greater than 1.

Polymerizing the diarylethenes can also be used to increase the population ratio of the antiparallel conformations to the parallel conformations.

The diarylethenes can be reacted in the presence of light. In one embodiment, an exemplary diarylethene can undergo a reversible cyclization reaction in the presence of light according to the following equation (I):

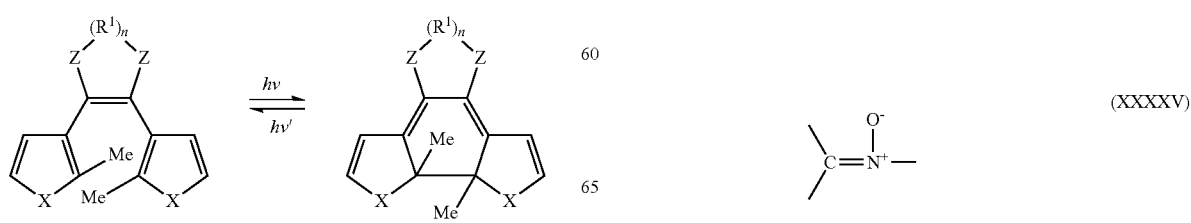

where X, Z $R^1$ and n have the meanings indicated above; and wherein Me is methyl. The cyclization reaction can be used to produce a hologram. The hologram can be produced by using radiation to react the open isomer form to the closed isomer form or vice-versa.

A similar reaction for an exemplary polymeric form of diarylethene is shown below in the equation (II)

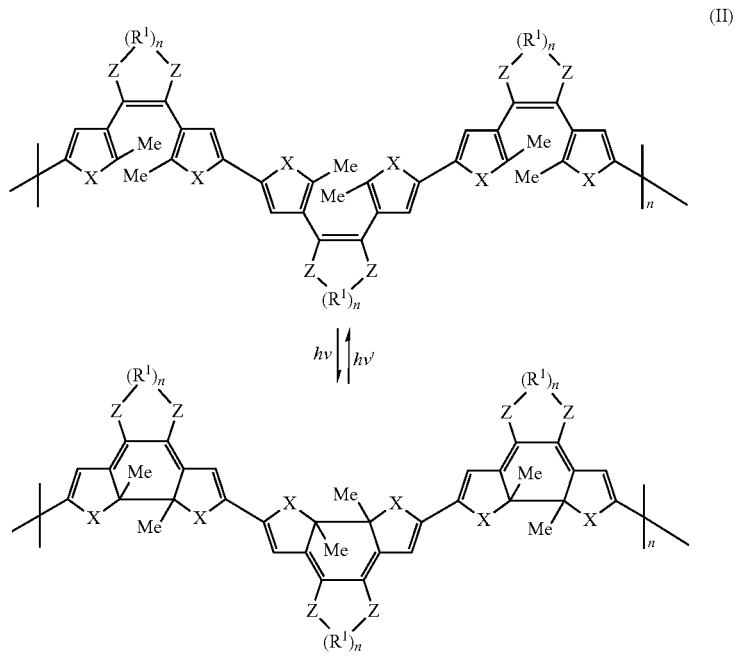

where X, Z $R^1$ and n have the meanings indicated above; and wherein Me is methyl.

Nitrones can also be used as photochromic dyes in the holographic storage media. Nitrones have the general structure shown in the formula (XXXXV):

(XXXXV)

An exemplary nitrone generally comprises an aryl nitrone structure represented by the formula (XXXXVI):

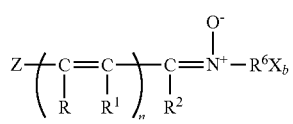

(XXXXVI)

wherein Z is $(R^3)_a$-Q-R$^4$— or R$^5$—; Q is a monovalent, divalent or trivalent substituent or linking group; wherein each of R, R$^1$, R$^2$ and R$^3$ is independently hydrogen, an alkyl or substituted alkyl radical containing 1 to about 8 carbon atoms or an aromatic radical containing 6 to about 13 carbon atoms; R$^4$ is an aromatic radical containing 6 to about 13 carbon atoms; R$^5$ is an aromatic radical containing 6 to about 20 carbon atoms which have substituents that contain hetero atoms, wherein the hetero atoms are at least one of oxygen, nitrogen or sulfur; R$^6$ is an aromatic hydrocarbon radical containing 6 to about 20 carbon atoms; X is a halo, cyano, nitro, aliphatic acyl, alkyl, substituted alkyl having 1 to about 8 carbon atoms, aryl having 6 to about 20 carbon atoms, carbalkoxy, or an electron withdrawing group in the ortho or para position selected from the group consisting of

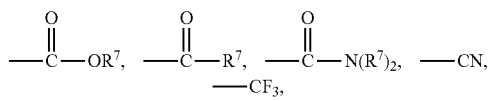

where R$^7$ is a an alkyl radical having 1 to about 8 carbon atoms; a is an amount of up to about 2; b is an amount of up to about 3; and n is up to about 4.

As can be seen from formula (XXXXVI), the nitrones may be α-aryl-N-arylnitrones or conjugated analogs thereof in which the conjugation is between the aryl group and an α-carbon atom. The α-aryl group is frequently substituted, most often by a dialkylamino group in which the alkyl groups contain 1 to about 4 carbon atoms. The R$^2$ is hydrogen and R$^6$ is phenyl. Q can be monovalent, divalent or trivalent according as the value of "a" is 0, 1 or 2. Illustrative Q values are shown in the Table 1 below.

TABLE 1

| Valency of Q | Identity of Q |
|---|---|
| Monovalent | fluorine, chlorine, bromine, iodine, alkyl, aryl; |
| Divalent | oxygen, sulphur, carbonyl, alkylene, arylene. |
| Trivalent | Nitrogen |

It is desirable for Q to be fluorine, chlorine, bromine, iodine, oxygen, sulfur or nitrogen.

Examples of nitrones are α-(4-diethylaminophenyl)-N-phenylnitrone; α-(4-diethylaminophenyl)-N-(4-chlorophenyl)-nitrone, α-(4-diethylaminophenyl)-N-(3,4-dichlorophenyl)-nitrone, α-(4-diethylaminophenyl)-N-(4-carbethoxyphenyl)-nitrone, α-(4-diethylaminophenyl)-N-(4-acetylphenyl)-nitrone, α-(4-dimethylaminophenyl)-N-(4-cyanophenyl)-nitrone, α-(4-methoxyphenyl)-N-(4-cyanophenyl)nitrone, α-(9-julolidinyl)-N-phenylnitrone, α-(9-julolidinyl)-N-(4-chlorophenyl)nitrone, α-[2-(1,1-diphenylethenyl)]-N-phenylnitrone, α-[2-(1-phenylpropenyl)]-N-phenylnitrone, or the like, or a combination comprising at least one of the foregoing nitrones. Aryl nitrones are particularly useful in the compositions and articles disclosed herein. An exemplary aryl nitrone is α-(4-diethylaminophenyl)-N-phenylnitrone.

Upon exposure to electromagnetic radiation, nitrones undergo unimolecular cyclization to an oxaziridine as shown in the structure (XXXXVII)

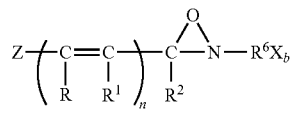

(XXXXVII)

wherein R, R$^1$, R$^2$, R$^6$, n, X$_b$ and Z have the same meaning as denoted above for the structure (XXXXVI).

In addition to the binder and the photochemically active dye, the holographic recording medium may include any of a number of additional components, including but not limited to heat stabilizers, antioxidants, light stabilizers, plasticizers, antistatic agents, mold release agents, additional resins, binders, and the like, as well as combinations of any of the foregoing components.

In one exemplary embodiment, the holographic recording medium is extruded as a relatively thin layer or film, e.g., having a thickness of 0.5 to 1000 microns. In another exemplary embodiment, a layer or film of the holographic recording medium is coated onto, co-extruded with, or laminated with a support. The support may be a planar support such as a film or card, or it may be virtually any other shape as well. In yet another exemplary embodiment, the holographic medium may be molded or extruded into virtually any shape capable of being fabricated by plastic manufacturing technologies such as solvent-casting, film extrusion, biaxial stretching, injection molding and other techniques known to those skilled in the art. Still other shapes may be fabricated by post-molding or post-extrusion treatments such as cutting, grinding, polishing, and the like.

The holographic image may be recorded in the holographic medium by any of a number of exposure set-ups. Transmission holograms may be recorded by directing the object light source and the reference light source onto the same surface of the holographic recording medium. A simplified diagram of an exemplary embodiment of an apparatus for recording a transmission hologram is shown in FIG. 1. In this configuration, the output from a laser 10 is divided into two equal beams by beam splitter 20. One beam, the signal beam 40, is incident on a form of spatial light modulator (SLM), deformable mirror device (DMD), or object to be recorded 30, which imposes the data to be stored in signal beam 40. An SLM or DMD device may be composed of a number of pixels that can block or transmit the light based upon input electrical signals. Each pixel can represent a bit or a part of a bit (a single bit can consume more than one pixel of the SLM or DMD 30) of data to be stored. The output of SLM/DMD/object 30 is then incident on the storage medium 60. The second beam, the reference beam 50, is transmitted all the way to storage medium 60 by reflection off first mirror 70 with minimal distortion. The two beams are coincident on the same area of holographic medium 60 at different angles. The net result is that the two beams create an interference pattern at their intersection in the holographic medium 60. The interference pattern is a unique function of the data imparted to signal beam 40 by SLM/DMD/object 30.

Figure 2:
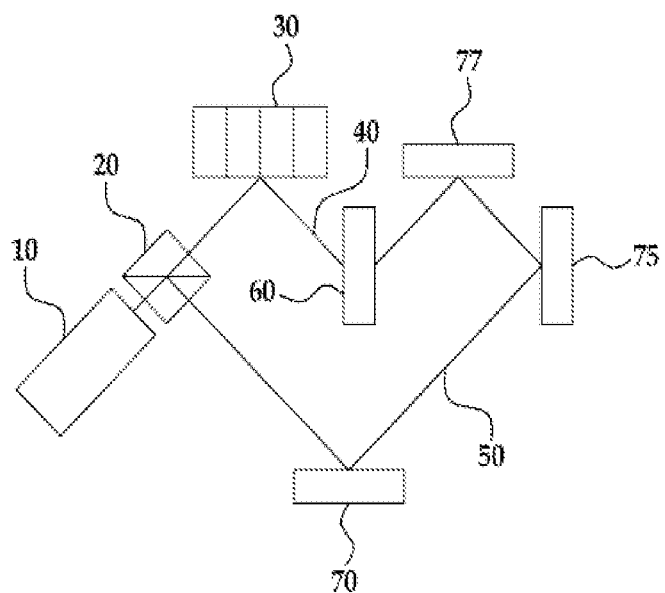
FIG. 2 represents a simplified diagram of an apparatus for recording a reflection hologram.

Reflection holograms may be recorded by directing the object light source and the reference light source onto different surfaces of the recording medium, such as opposite sides of a holographic recording film. However, the refraction produced by the interference fringes that are often formed by such exposure results may only be viewable at a wavelength close to the exposure wavelength, in which case the use of a light-blocking layer as described herein may adversely impact the viewability of the holographic image. In one exemplary embodiment, a reflection hologram produced by directing the object light source and reference light source onto different sides of the recording medium may be viewable in a different wavelength than the recording wavelength if the angle of incidence (θ) of the light sources onto the holographic medium is high (e.g., greater than or equal to about 40°). Since such angles may exceed the critical angle of incidence of the holographic recording medium, a light refracting medium such as a prism may be placed in intimate contact with the surface of the holographic recording medium in order to direct the exposure light sources into the holographic medium at high angles of incidence to produce a reflection hologram that can be viewed at a wavelength other than the exposure wavelength, as disclosed in copending US patent application filed on even date herewith in the names of Michael Takemori et al under Ser. No. 13/028,529 entitled "Holographic Recording Method", the disclosure of which is incorporated herein by reference in its entirety. A simplified diagram of an exemplary embodiment of an apparatus for recording a reflection hologram is shown in FIG. 2. In this configuration, the output from a laser 10 is divided into two equal beams by beam splitter 20. One beam, the signal beam 40, is incident on a form of spatial light modulator (SLM), digital light projector (DLP), deformable mirror device (DMD), mask or object to be recorded 30, which imposes the image or data to be stored in signal beam 40. An SLM or DMD device may be composed of a number of pixels that can block or transmit the light based upon input electrical signals. Each pixel can represent a bit or a part of a bit (a single bit can consume more than one pixel of the SLM or DMD 30) of data to be stored. The output of SLM/DMD/object 30 in the form of the signal beam enters holographic recording medium 60. The second beam, the reference beam 50, is transmitted to holographic recording medium 60 by reflection off mirrors 70, 75, and 77 with minimal distortion. The two beams are coincident on the same area of holographic recording medium 60 from different directions. The net result is that the two beams create an interference pattern at their intersection in the holographic recording medium 60. The interference pattern is a unique function of the data or image information imparted to signal beam 40 by SLM/DMD/object 30.

The light blocking layer should generally block transmission of light at wavelength(s) to which the photochemically active dye in the holographic recording medium is sensitive while allowing transmission of light at other wavelengths for viewing the recorded holographic image. In one exemplary embodiment, the light blocking layer should have an absorbance (i.e., optical density) greater than or equal to about 2 in the wavelengths to which the photochemically active dye is sensitive. In another exemplary embodiment, the light blocking layer should have an absorbance (i.e., optical density) greater than or equal to about 3 in the wavelengths to which the photochemically active dye is sensitive. In a further exemplary embodiment, the light-blocking layer has an absorbance in relevant viewing wavelength(s) of less than 0.2. In another further exemplary embodiment, the light-blocking layer has an absorbance in relevant viewing wavelength(s) of less than 0.1. In yet another further exemplary embodiment, the light-blocking layer has an absorbance in relevant viewing wavelength(s) of less than 0.01. In an exemplary embodiment, the absorbance of the light blocking layer extends to wavelengths above the wavelength at which the photochemically active dye is written. In a more specific exemplary embodiment, the light blocking layer has less than or equal to 20% transmittance up to a wavelength of about 20 nm higher than the writing wavelength. In another more specific exemplary embodiment, the light blocking layer has less than or equal to 20% transmittance up to a wavelength of about 30 nm higher than the writing wavelength. Also, some photochemically active dyes for holographic imaging exhibit sensitivity in lower wavelengths below the writing wavelength, such as in the UV range. For such dyes, the light blocking layer should also block light in those wavelengths, which may necessitate a combination of light-blocking moieties in the light blocking layer.

Generally, broader ranges of wavelengths of low absorbance, outside of the range to which the photochemically active dye is sensitive, will provide enhanced viewability of the holographic image. Accordingly, a sharp transition (i.e., a steep peak or drop-off in an absorbance plot) between wavelengths at which the light-blocking layer blocks light and wavelengths where it transmits light may enhance viewability. In one exemplary embodiment, the difference between the wavelength at which the light-blocking layer transmits 20% (20% transmittance) of the light and the wavelength at which it transmits 80% of the light (80% transmittance) is less than or equal to about 50 nm. In another exemplary embodiment, the difference between the wavelength at which the light-blocking layer transmits 20% (20% transmittance) of the light and the wavelength at which it transmits 80% of the light (80% transmittance) is less than or equal to about 30 nm. In yet another exemplary embodiment, the difference between the wavelength at which the light-blocking layer transmits 20% (20% transmittance) of the light and the wavelength at which it transmits 80% of the light (80% transmittance) is less than or equal to about 15 nm.

The light-blocking layer or material may include a polymeric binder, including but not limited to any of the polymeric binders described above with respect to the holographic recording medium. For the light-blocking layer, however, the polymeric binder doesn't have to be transparent in the exposure wavelengths, since any absorbance in the exposure wavelengths will only enhance the light-blocking capabilities. The light-blocking layer or material may also include one or more filter dyes. Exemplary optically absorptive species include, but are not limited to organic dyes, organometallic dyes, absorptive polymers (e.g., DuPont Kapton®), polymer-bound organic or organometallic dyes, and combinations of any of the above. Several exemplary classes of organic dye molecules include 2-hydroxybenzophenones (e.g., 2-(4-benzoyl-3-hydroxyphenoxy)ethyl acrylate, A), formamides (e.g., N-(2-ethoxy-phenyl)-N'-(2-ethyl-phenyl)-oxalamide, B), azomethines (e.g., 3-phenyliminomethyl-quinoline-2,4-diol, C), quinones (e.g., cyclohexa-2,5-diene-1,4-dione, D), anthraquinones (1-[4-(1-methyl-1-phenyl-ethyl)-phenoxy]-anthraquinone, E), salicylates (e.g., 2-hydroxy-benzoic acid 4-tert-butyl-phenyl ester, F), benzotriazoles (e.g. 2-benzotriazol-2-yl-6-(1,1-dimethyl-propyl)-4-(1,1,3,3-tetramethyl-butyl)-phenol, G), oxazinones (e.g., 2,2-(p-phenylen)di-3,1-benzoxazin, H), triazines (e.g., 2-(4,6-diphenyl-1,3,5-triazin-2-yl)-5-[(hexyl)oxy]-phenol, I), cyanoacrylates (e.g., 1,3-bis-(2'-cyano-3,3'-diphenylacryloy-loxy)-2,2-bis-[(2-cyano-3',3'-diphenylacryloxyloxy]methyl-propane, J), substituted malonic esters (e.g., tetraethyl 2,2'-(1,4-phenylenedimethylidyne)-bismalonate, K), phthalones (e.g., 2-pyridin-2-yl-indan-1,3-dione, L), substituted benzyl-barbituric acid derivatives (e.g. 5-(4-methoxybenzylidene)

pyrimidine-2,4,6(1H,3H,5H)-trione, M), substituted or unsubstituted naphthyl-barbituric acid derivatives (e.g., 5-(naphthalen-1-ylmethylene)pyrimidine-2,4,6(1H,3H,5H)-trione, N), substituted thiophenyl-barbituric acid derivatives (e.g., 5-((5-ethylthiophen-2-yl)methylene)pyrimidine-2,4,6 (1H,3H,5H)-trione, O), substituted furanyl-barbituric acid derivatives (e.g., 5-((5-methylfuran-2-yl)methylene)pyrimidine-2,4,6(1H,3H,5H)-trione, P).

(A)
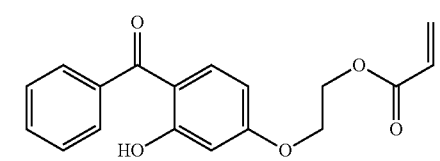

(B)
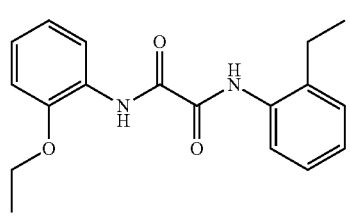

(C)
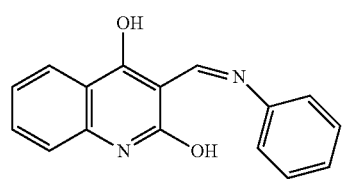

(D)
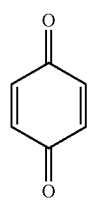

(E)
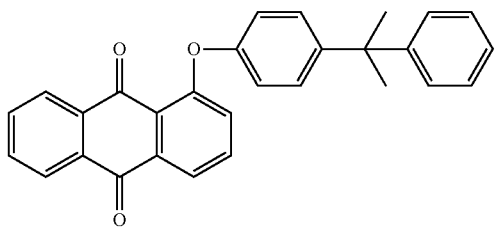

(F)
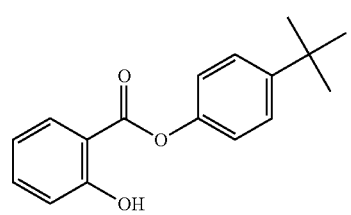

-continued (G)
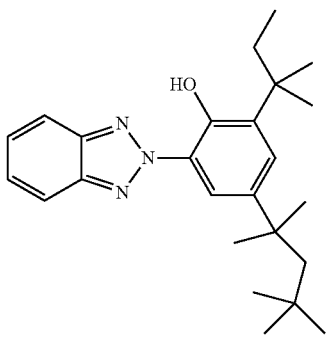

(H)
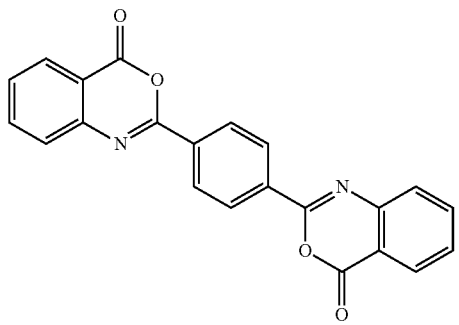

(I)
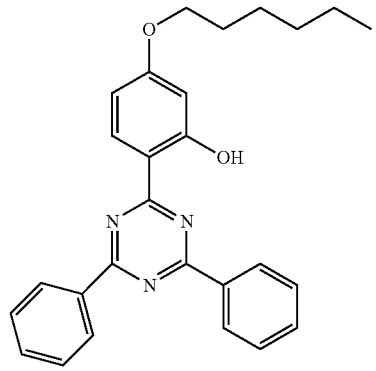

(J)
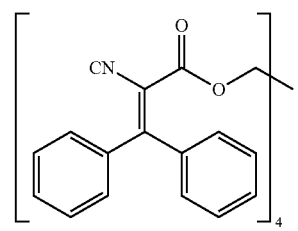

(K)
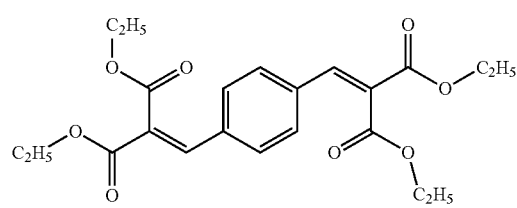

(L)
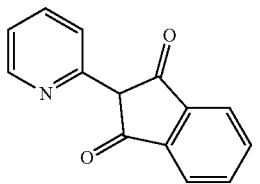

(M)
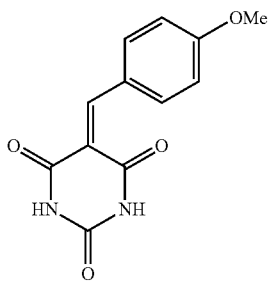

(N)
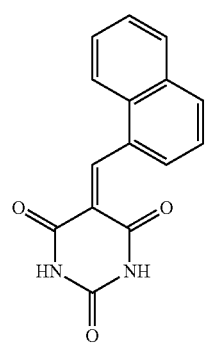

(O)
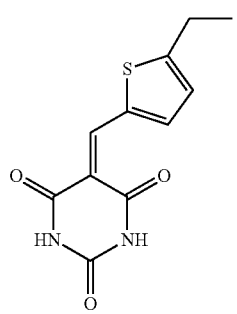

(P)

In order to cover the range of wavelengths to which the holographic materials may be sensitive, a combination of the above dyes with known UV blocking chemistries may be advantageous and myriad chemistries are available for UV light blocking and are known to those skilled in the art (e.g. Tinuvin, Uvinil, Cyasorb UV blocking dye families)

In an exemplary embodiment, the blocking dye is a pyrophthalone having the formula:

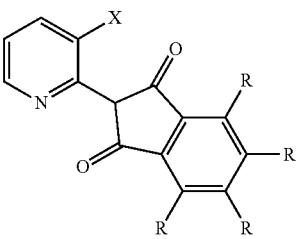

where X is hydrogen or hydroxyl and R is hydrogen or chloride. Additionally, pyrophthalone is susceptible to the formation of, and subsequent reaction with singlet oxygen species, which can lead to degradation of the dye and loss of performance. Thus, a range of singlet oxygen scavenger moieties (e.g., hindered amines, metal complexes, DABCO, TEMPO, phenylphenol, TCNE, DPBF, Butazate, Naugard 445, etc.) may be used. In one exemplary embodiment, α-tocopherol (a form of Vitamin E) may be used for a combination of processability and stabilization that it affords.

As the light blocking layer or material absorbs light in the same region as the light source that will expose the holographic recording medium to record the holographic image, it will generally be disposed over the holographic recording medium after the image is recorded. The light blocking layer or material may be disposed directly onto the holographic recording medium, or it may have one or more other intervening layers between the holographic recording medium and the light blocking layer or material, as long as the light blocking layer or material is positioned to block light of the targeted wavelength(s) from reaching the holographic recording medium. In this regard, the use herein of the term "over" with respect to the light blocking layer being disposed over the holographic recording medium is intended to include both embodiments where it is disposed directly on the holographic recording medium as well as embodiments where there are one or more other intervening layers. The light blocking layer or material may be applied by any of a number of technologies, including but not limited to spray coating, dip coating, inkjet printing, screen printing, or pre-forming a light-blocking film using solvent-casting, film extrusion, biaxial stretching and other techniques known to those skilled in the art, and applying it to the holographic recording medium with a pressure-sensitive or other adhesive, heat laminating, static charge adhesion, or mechanically affixing it to the holographic recording medium. In some exemplary embodiments, excessive heat and/or pressure may adversely impact the already-formed holographic image, in which case heat lamination may be enhanced with a heat or pressure sensitive adhesive to reduce the heat exposure needed for the lamination process. Additionally, in some exemplary embodiments, a protective transparent top layer may be applied over the light blocking layer to protect it and the other underlying layers.

Figure 3:
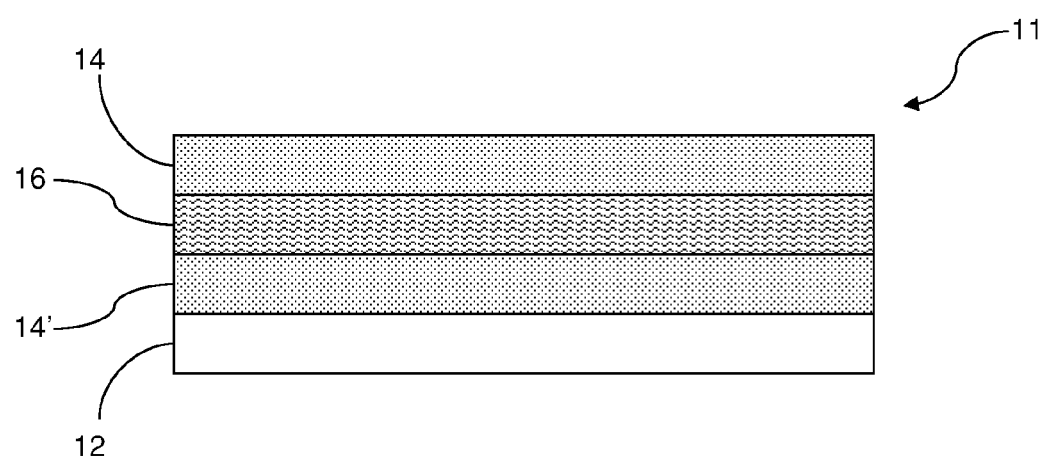
FIG. 3 represents a transmission hologram with a light-blocking layer, for viewing in transmission.

In an exemplary embodiment as shown in FIG. 3, an article 11 for recording a transmission holographic image comprises support 12 having thereon light blocking layer 14', holographic recording layer 16, and light blocking layer 14. The support may be any transparent material, including but not limited to the materials described above as polymer binders for holographic recording media, glass, and the like. Since a transmission hologram will be recorded by directing both the object light source and reference light source onto the same surface of the holographic recording layer 16, only one surface need be left unprotected by a light blocking layer for the recording process. Accordingly, in an exemplary embodiment, an element of support 12, light blocking layer 14', and holographic recording layer 16 may be formed first (e.g., by co-extrusion, lamination or other fabrication process), followed by exposure on the upper surface of holographic recording layer 16 to record a transmission holographic image. After recording of the holographic image, light blocking layer 14 may then be disposed (e.g., by laminating, adhering a film, printing, coating, dip coating, solvent-casting, spin coating, and the like) onto the element to form the article 11. Of course, it is not required to dispose light blocking layer 14' onto the holographic recording layer 16 prior to exposure, and other fabrication methodologies could be used. For example, the holographic recording layer could be fabricated first, followed by exposure and then lamination with the other layers to form the article 11. FIG. 3 depicts the light blocking layer 14 and light blocking layer 14 disposed over the entire area of the holographic medium 16. In another alternative embodiment, the light blocking layer need only be disposed over a portion of the holographic recording medium or a portion of the article, such as where a holographic image is recorded in only a portion of the holographic recording medium or article.

Figure 4:
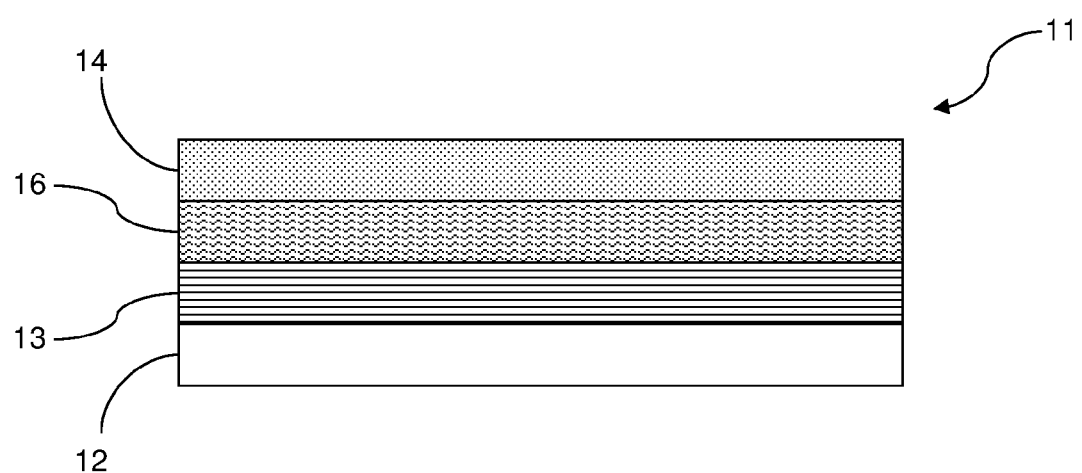
FIG. 4 represents a transmission hologram with a light-blocking layer, for viewing in reflection.

In another exemplary embodiment as shown in FIG. 4, an article 11 for recording a transmission holographic image viewable as a reflection image comprises support 12 having thereon an opaque reflecting layer 13, transmission holographic recording layer 16, and light blocking layer 14. The support may be any transparent material, including but not limited to the materials described above as polymer binders for holographic recording media, glass, and the like. Although the holographic image recorded in layer 16 will be a transmission image, the light source for viewing will be directed from above the article 11 through light blocking layer 14 and the transmission hologram recorded in layer 16, from where it will reflect off of reflecting layer 13 and exit through light blocking layer 14 where it will be viewed, appearing as a reflection hologram. Since no viewing light need enter from the underside of the article, support 12 may be transparent (if the reflective layer 13 is opaque) or support 12 may be opaque. In an exemplary embodiment, the reflecting layer 13 may not be completely opaque, in which case support 12 should be opaque. Since the transmission hologram to be recorded in layer 16 will be recorded by directing both the object light source and reference light source onto the same surface of the holographic recording layer 16, only one surface need be left unprotected by a light blocking layer for the recording process. Accordingly, in an exemplary embodiment, an element of support 12, reflecting layer 13, and holographic recording layer 16 may be formed first (e.g., by co-extrusion, lamination or other fabrication process), followed by exposure on the upper surface of holographic recording layer 16 to record a transmission holographic image. After recording of the holographic image, light blocking layer 14 may then be disposed (e.g., by laminating or spray coating) onto the element to form the article 11. Of course, it is not required to dispose reflecting layer 13 onto the holographic recording layer 16 prior to exposure, and other fabrication methodologies could be used. For example, the holographic recording layer could be fabricated first, followed by exposure and then lamination with the other layers to form the article 11.

Figure 5:
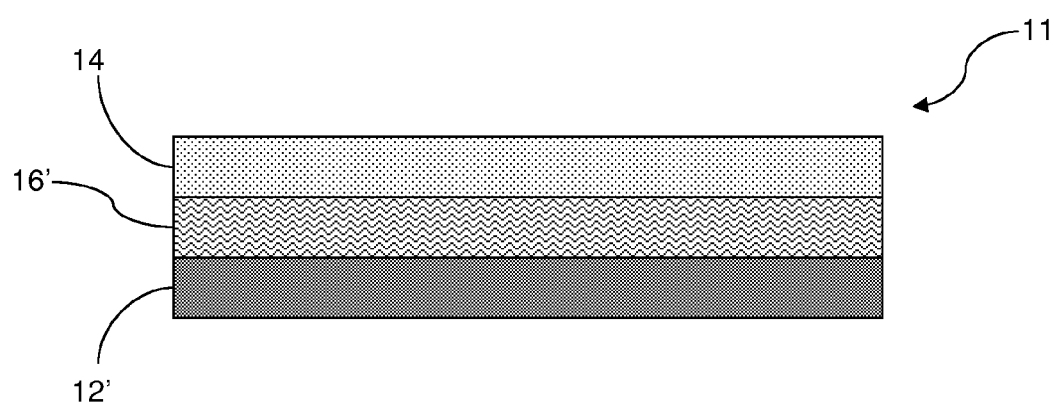
FIG. 5 represents a reflection hologram with a light-blocking layer.

In another exemplary embodiment as shown in FIG. 5, an article 11 for recording a reflection holographic image viewable as a reflection image comprises opaque support 12' having thereon a reflection holographic recording layer 16', and light blocking layer 14. The support may be any material, including but not limited to the materials described above as polymer binders for holographic recording media, glass, and the like, and may include opacifying agents such as pigments. Alternatively, an opaque coating or layer (not shown) may be disposed on either side of support 12' to render provide opacity. Since the reflection hologram to be recorded in layer 16' will be recorded by directing the object light source and reference light source onto the opposite sides of holographic recording layer 16', the holographic recording layer 16' may be fabricated first, followed by exposure and then lamination with support 12' and light blocking layer 14 to form the article 11.

The disclosure is further illustrated by the following non-limiting examples:

EXAMPLES

The following exemplary compositions were developed for holographic media optimized for recording at 405 nm, though the key criteria may be translated for use with films optimized for recording at other wavelengths. The blocking films tested herein are comprised of a blocking dye (pyrophthalone, synthesis described below), a UV blocking dye (Tinuvin 326, BASF), a singlet oxygen stabilizer (alpha-tocopherol) dispersed in a polymeric binder (HFD Lexan, SABIC-IP C14090).

The pyrophthalone (2-(pyridin-2-yl)-1H-indene-1,3(2H)-dione) dye (CAS #641-63-4) was synthesized by the condensation of 2-picoline with phthalic anhydride in the presence of zinc chloride in the following reaction sequence:

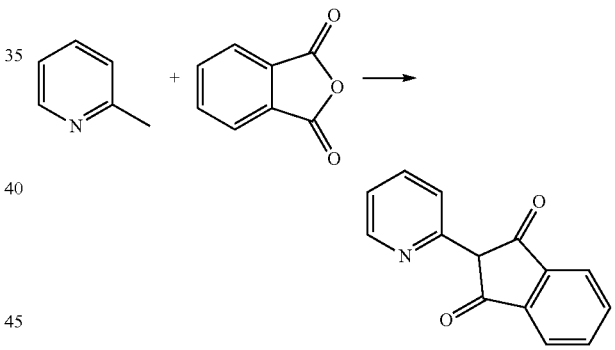

Figure 6:
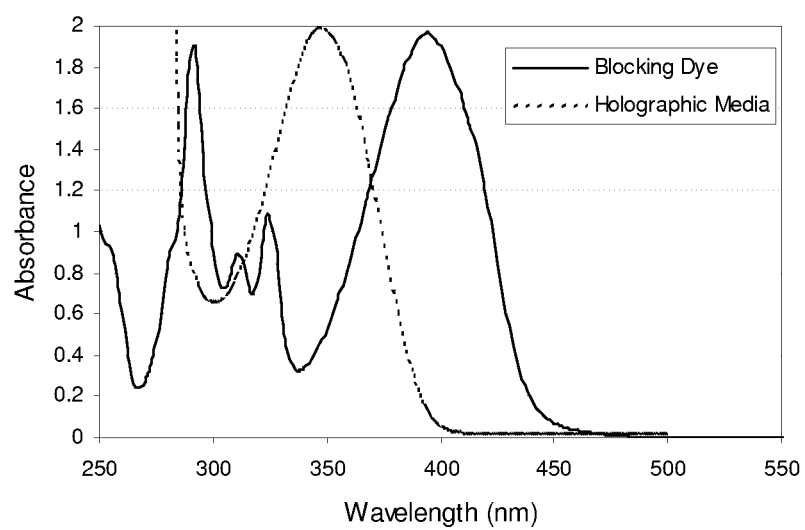
FIG. 6 represents a plot of spectral absorbance of an exemplary dye for a light-blocking layer and of a photochemically active dye used for holographic recording.

Unsubstituted pyrophthalone exhibits an absorption peak at approximately 390 nm with minimal absorption (i.e. OD less than 0.1) at wavelengths greater than approximately 450 nm when dissolved in methylene chloride at a concentration of 0.02 mg/ml as shown in FIG. 6 (solid line). Additionally, the absorptions spectrum of a representative photosensitive molecule (N-isopropylstyryl nitrone) used in holographic media is shown for comparison (dashed line). The absorption spectra reveal that photons with wavelengths lower than the absorption maximum of pyrophthalone (i.e. between approximately 250 and 370 nm) are not fully blocked by pyrophthalone, and thus may be absorbed by the photosensitive moieties, potentially leading to hologram degradation. Thus, a second absorber, which covers the range below 370 nm may be employed (i.e. a UV absorber). In this case, Tinuvin 326 was chosen for its absorption spectrum and compatibility with the rest of the components of the film.

Films with the following composition were produced for hologram longevity testing under accelerated and ambient aging.

Figure 7:
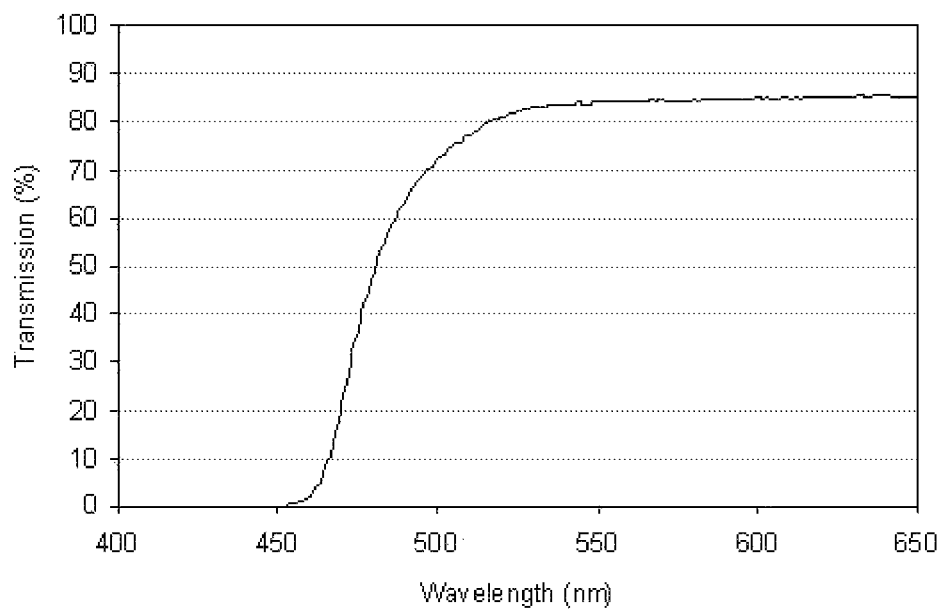
FIG. 7 represents a plot of spectral transmission of an exemplary light-blocking layer.

Solvent Casting:
1.0 g HFD Lexan (C14090)
10.0 mg Pyrophthalone (1% w/w)
10.0 mg a-tocopherol (1% w/w)
12.0 mg Tinuvin 326 (1% w/w)
20 ml methylene chloride Samples were cast in 3" diameter ground metal rings on glass substrates at 40° C., and dried overnight in a vacuum oven at 40° C. The resulting films exhibited transmission spectra as shown in FIG. 7.

Hologram longevity was assessed based on quantitative digital imaging of spot holograms recorded in 405 nm-sensitive holographic media, and showed greater than 800-fold hologram stabilization versus un-blocked holograms (time to 50% degradation of hologram viewability) under accelerated testing (warm white fluorescent lighting, 3.5 mW @405 nm, 26-28° C.). Testing under ambient conditions (indoor lighting, ambient temperature) is ongoing and shows near complete hologram stabilization over >3 months exposure.

Additionally, pyrophthalone has been integrated into an ink formulation along with UV and singlet oxygen stabilizers for thin film deposition via inkjet printing. The ink composition is shown below, and films were printed on a FujiFilm Dimatix 2800 inkjet printer and dried briefly in a vacuum oven.
20 mg pyrophthalone
15 mg Tocopherol
10 mg Tinuvin 326
100 mg Elvacite 2010 PMMA
2 ml N-methyl phosphonate Varying the pyrophthalone concentration in the blocking film allows the coloration as well as the degree of stabilization to be tuned for particular applications (e.g., holographic materials exposed to outdoor illumination (e.g., ID badges, signage, etc.), require greater stabilization than those which are only intermittently exposed to illumination, such as secure documents (e.g., passports, national ID). The cutoff wavelength may be tuned over the range from 410-450 nm, depending on dye concentration and film thickness depending on the aesthetic and stabilization requirements of particular applications, with according hologram stabilizations of 250 to 1000-fold over un-blocked (results from accelerated testing).

The pyrophthalone concentration may be varied over a range from 0.1% w/w to 5% w/w and up to 20% or more for very thin film applications (i.e. ink formulations). α-Tocopherol (singlet oxygen stabilizer) concentrations were been maintained at 1:1 weight ratio with the pyrophthalone, though the stabilizing effect was observed to scale with the amount added.

While the invention has been described with reference to exemplary embodiments, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention.

The invention claimed is:

1. A method of manufacturing an article with a volume holographic image, comprising:
exposing a holographic recording medium having a plurality of surfaces, comprising a photochemically active dye and a transparent polymeric binder to a plurality of coherent light sources emitting light at one or more writing wavelengths to which the photochemically active dye is sensitive, thereby forming a holographic image therein formed by photoreacted areas of the photochemically active dye and unreacted areas of the photochemically active dye; and then
applying a first light-blocking layer or material with a pressure-sensitive or other adhesive, heat lamination, static charge adhesion, or mechanically affixing to a first surface of the holographic recording medium from which surface the holographic image is viewed, said light blocking layer or material absorbing light over the entire wavelength range to which the photochemically active dye is sensitive and allowing transmission of light in a different wavelength range for viewing the holographic image.

2. The method of claim 1, wherein the object beam light source and reference beam light source are directed onto a surface of the holographic recording medium to form a transmission holographic image viewable from the first surface when light directed onto a second surface of the holographic recording medium passes through the holographic recording medium and exits through the first surface, and further comprising, after exposing the holographic recording medium, applying a second light-blocking layer or material, which may have a composition that is the same as or different from the first light-blocking layer or material, over the second surface of the holographic recording medium, said second light blocking layer or material absorbing light over the entire wavelength range to which the photochemically active dye is sensitive and allowing transmission of light in a different wavelength range for viewing the holographic image.

3. The method of claim 2, wherein the holographic recording medium is a holographic film, and the first surface is on one side of the holographic film and the second surface is on the opposite side of the holographic film.

4. The method of claim 1, wherein the object beam light source and reference beam light source are directed onto a surface of the holographic recording medium to form a transmission holographic image viewable from the first surface when light directed onto the first surface of the holographic recording medium reflects off of a reflecting layer or material disposed over a second surface of the holographic recording medium.

5. The method of claim 4, wherein the reflecting layer or material is opaque or absorbs light in the wavelength range to which the photochemically active dye is sensitive.

6. The method of claim 4, wherein the reflective layer is non-opaque, said method further comprising applying a layer or material, over or under the reflecting material, that is opaque or absorbs light in the wavelength range to which the photochemically active dye is sensitive.

7. The method of claim 4, wherein the holographic recording medium is a holographic film, and the first surface is on one side of the holographic film and the second surface is on the opposite side of the holographic film.

8. The method of claim 1, wherein one of the object beam light source and the reference beam light source is directed onto the first surface of the holographic recording medium and the other of the object beam light source and the reference beam light source is directed onto a second surface of the holographic recording medium to form a reflection holographic image viewable from the first surface when light is directed onto the first surface of the holographic recording medium, and further comprising, after exposing the holographic recording medium, applying a layer or material over the second surface that is opaque or absorbs light over the entire wavelength range to which the photochemically active dye is sensitive.

9. The method of claim 8, wherein the holographic recording medium is a holographic film, and the first surface is one side of the holographic film and the second surface is the opposite side of the holographic film.

10. The method of claim 1, wherein the light blocking layer or material comprises an organic or organometallic dye and a polymeric binder 11. The method of claim 10, wherein the organic or organometallic dye includes a UV absorber dye.

12. The method of claim 10, wherein the organic or organometallic dye is selected from the group consisting of benzoquinones, benzotriazoles, anthraquinones, phthalones, pyrophthalones, cyanoacrylates, benzophenones, salicylates, hindered amines, azomethines, pyrophthalones, phthalones, quinones, barbituric acid derivatives, and combinations thereof.

13. The method of claim 10, wherein the organic or organometallic dye is present in an amount of 0.1 to 25 wt. % with respect to the polymeric binder.

14. The method of claim 10, wherein the polymeric binder is a thermoplastic or thermoset polymer selected from the group consisting of polyacrylates, polymethacrylates, polyesters, polyolefins, polycarbonates, polystyrenes, polyesters, polyamideimides, polyarylates, polyarylsulfones, polyethersulfones, polyphenylene sulfides, polysulfones, polyimides, polyetherimides, polyetherketones, polyether etherketones, polyether ketone ketones, polysiloxanes, polyurethanes, polyethers, polyether amides, polyether esters, and combinations thereof.

15. The method of claim 10, wherein the light blocking layer or material is disposed over the first surface of the holographic recording medium by screen printing, inkjet printing, spray coating, dip coating, solvent-casting, or spin coating onto a surface of the article.

16. The method of claim 10, wherein the light-blocking layer is a disposed over the first surface by adhering a film comprising said organic or organometallic dye and 17. The method of claim 1, where in the light-blocking layer has a thickness between 0.5 micron and 1000 microns.

18. The method of claim 1, wherein the light blocking layer or material is disposed over a portion of the first surface of the holographic recording medium. polymeric binder onto a surface of the article.

* * * * *

UNITED STATES PATENT AND TRADEMARK OFFICE
CERTIFICATE OF CORRECTION

PATENT NO. : 8,728,685 B2  
APPLICATION NO. : 13/028807  
DATED : May 20, 2014  
INVENTOR(S) : Andrew A. Burns et al.

Page 1 of 1

It is certified that error appears in the above-identified patent and that said Letters Patent is hereby corrected as shown below:

On the Title Page, (63) the Related U.S. Application Data listed as "Continuation-in-part of application No. 12/491,357, filed on Jun. 25, 2008, now abandoned." should be deleted and replaced with "Continuation-in-part of application No. 12/491,357, filed on Jun. 25, 2009, now abandoned."

Signed and Sealed this  
Ninth Day of December, 2014

Michelle K. Lee  
*Deputy Director of the United States Patent and Trademark Office*